(12) United States Patent
Nakagoshi

(10) Patent No.: US 9,686,521 B2
(45) Date of Patent: Jun. 20, 2017

(54) IMAGE PROCESSING DEVICE, IMAGE PROCESSING METHOD, AND PROJECTION APPARATUS

(71) Applicant: JVC KENWOOD Corporation, Yokohama-shi, Kanagawa (JP)

(72) Inventor: Ryosuke Nakagoshi, Yokohama (JP)

(73) Assignee: JVC KENWOOD CORPORATION, Kanagawa (JP)

(*) Notice: Subject to any disclaimer, the term of this patent is extended or adjusted under 35 U.S.C. 154(b) by 0 days.

(21) Appl. No.: 15/138,541

(22) Filed: Apr. 26, 2016

(65) Prior Publication Data

US 2016/0241826 A1 Aug. 18, 2016

Related U.S. Application Data

(63) Continuation of application No. PCT/JP2014/078413, filed on Oct. 24, 2014.

(30) Foreign Application Priority Data

Oct. 31, 2013 (JP) .................................. 2013-226289

(51) Int. Cl.
*H04N 9/31* (2006.01)
*G09G 3/20* (2006.01)
(Continued)

(52) U.S. Cl.
CPC ............ *H04N 9/3179* (2013.01); *G09G 3/002* (2013.01); *G09G 3/20* (2013.01); *G09G 5/391* (2013.01);
(Continued)

(58) Field of Classification Search
USPC .................................................. 348/687, 688
See application file for complete search history.

(56) References Cited

U.S. PATENT DOCUMENTS

| 5,297,221 A | 3/1994 | Masuda et al. |
| 2003/0020836 A1* | 1/2003 | Kobayashi ............. H04N 5/208 348/625 |

(Continued)

FOREIGN PATENT DOCUMENTS

| GB | 2352352 | 1/2011 |
| JP | 04-035466 | 2/1992 |

(Continued)

OTHER PUBLICATIONS

Extended European Search Report for European Patent Application No. 14857287.8 mailed on Jul. 29, 2016.
(Continued)

*Primary Examiner* — Paulos M Natnael
(74) *Attorney, Agent, or Firm* — Amin, Turocy & Watson LLP

(57) ABSTRACT

A first sum is calculated which is a sum of light intensities of dispersed lights generated when a pixel light by a target pixel passes through an optical system, and a first light intensity is calculated by adding the first sum to a light intensity of the pixel light of the target pixel. A second sum is calculated which is a sum, at a position of the target pixel, of each of light intensities of dispersed lights generated when each of pixel lights by pixels around the target pixel pass through the optical system. A second light intensity of the pixel light by the target pixel is calculated by subtracting the second sum from the first light intensity.

6 Claims, 6 Drawing Sheets

(51) Int. Cl.
*G09G 3/00* (2006.01)
*G09G 5/391* (2006.01)
*G09G 5/397* (2006.01)
*H04N 9/77* (2006.01)

(52) U.S. Cl.
CPC ........... *G09G 5/397* (2013.01); *H04N 9/3182* (2013.01); *H04N 9/77* (2013.01); *G09G 2320/0285* (2013.01); *G09G 2320/0673* (2013.01); *G09G 2360/126* (2013.01); *G09G 2360/16* (2013.01); *G09G 2360/18* (2013.01)

(56) References Cited

U.S. PATENT DOCUMENTS

| | | | |
|---|---|---|---|
| 2003/0035590 A1 | 2/2003 | Takeuchi et al. | |
| 2007/0171796 A1* | 7/2007 | Tokuyama | G11B 7/0065 369/53.15 |
| 2007/0206485 A1* | 9/2007 | Yoon | H04N 5/90 369/275.4 |
| 2008/0246950 A1* | 10/2008 | Ono | G01J 1/04 356/51 |
| 2012/0069181 A1* | 3/2012 | Xue | G01J 3/0229 348/148 |
| 2016/0255313 A1* | 9/2016 | Samejima | G03B 21/2033 |

FOREIGN PATENT DOCUMENTS

| | | |
|---|---|---|
| JP | 2003-032580 | 1/2003 |
| JP | 2006-254238 | 9/2006 |
| JP | 2009-042838 | 2/2009 |

OTHER PUBLICATIONS

International Search Report for International Patent Application No. PCT/JP2014/078413 dated Jan. 20, 2015, 5 pages.

Written Opinion for International Patent Application No. PCT/JP2014/078413 dated Jan. 20, 2015, 3 pages.

\* cited by examiner

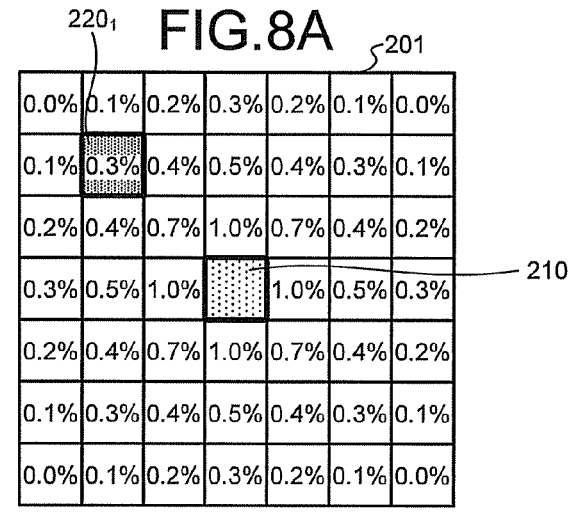
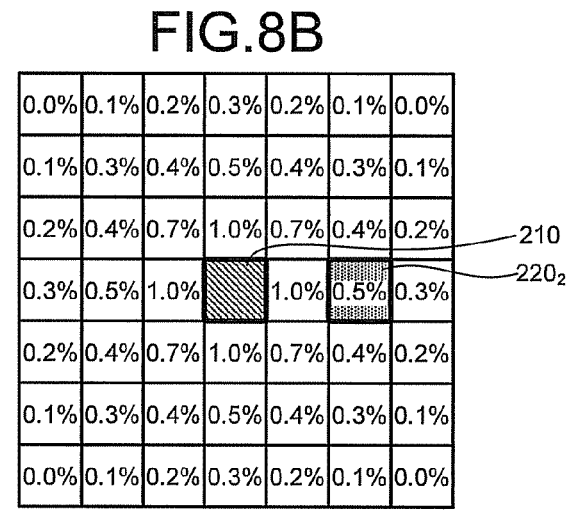
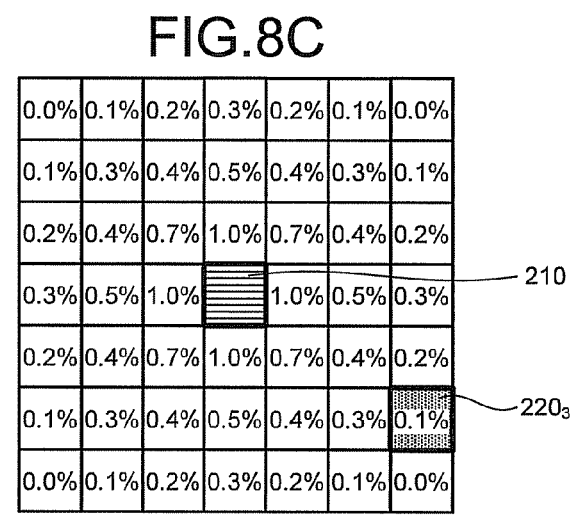

IMAGE PROCESSING DEVICE, IMAGE PROCESSING METHOD, AND PROJECTION APPARATUS

CROSS REFERENCE TO RELATED APPLICATIONS

This application is a continuation of PCT international application Ser. No. PCT/JP2014/078413 filed on Oct. 24, 2014 which designates the United States, incorporated herein by reference, and which claims the benefit of priority from Japanese Patent Application No. 2013-226289, filed Oct. 31, 2013 incorporated herein by reference.

FIELD

The present invention relates to an image processing device, an image processing method, and a projection apparatus.

BACKGROUND

Known in the related art is a projection apparatus that projects an image based on an image signal on a projection medium such as a screen and a wall by driving a display element based on an input image signal, modulating light from a light source by the display element, and emitting the light through an optical system.

The optical system uses an optical component such as a projection lens and a cross dichroic prism. The light that has been modulated by the display element is, upon passing through the optical system, affected based on properties of the optical component used in the optical system. This causes a phenomenon called an optical flare where an edge portion on a projected image that is projected on the projection medium bleeds. Disclosed in Patent Literature 1 is a configuration where the optical flare is corrected in response to ambient lights by image processing.

CITATION LIST

Patent Literature

Patent Literature 1: Japanese Patent Application Laid-open No. 2006-254238

SUMMARY

Technical Problem

An object of the present invention is to enable an image to be projected with a higher quality.

Meanwhile, a display element is driven for each pixel in response to an image signal, and light from a light source is modulated for each pixel and projected on a projection medium. Thus, the optical flare described above is to occur as light bleeding where the light bleeds for each pixel. This light bleeding becomes a factor that deteriorates resolution and color saturation of an image projected on the projection medium.

That is, at a light spot corresponding to one pixel on the projection medium, light components due to the light bleeding based on the light spot exist at a predetermined ratio around the light spot. As an example, R (red) and G (green) light spots (pixels) that are projected on a position close to each other will be considered. In this case, for example, at a position of the R light spot, the light component of the light bleeding based on the close G light spot is superimposed, and the color saturation of R at the R light spot is deteriorated.

In addition, the light component of one light spot is dispersed peripherally due to the light bleeding. Therefore, luminance of the light spot decreases, and the resolution of an image decreases by blending with the light components of close two light spot.

The above-described Patent Literature 1 is to correct blur of an edge portion in an image, caused by the optical flare, and is difficult to apply to elimination of the light bleeding for each pixel.

Solution to Problem

In an aspect of the present invention, there is provided an image processing device comprising: a first calculation unit that calculates a first sum which is a sum of light intensities of dispersed lights generated when a pixel light by a target pixel passes through an optical system to calculate a first light intensity by adding the first sum to a light intensity of the pixel light; a second calculation unit that calculates a second sum which is a sum, at a position of the target pixel, of each of light intensities of dispersed lights generated when each of pixel lights by pixels around the target pixel pass through the optical system; and a combining unit that calculates a second light intensity of the pixel light by the target pixel by subtracting the second sum from the first light intensity.

BRIEF DESCRIPTION OF DRAWINGS

FIG. 8A is a diagram for describing more specifically the effects of the peripheral pixels on the target pixel.

FIG. 8B is a diagram for describing more specifically the effects of the peripheral pixels on the target pixel.

FIG. 8C is a diagram for describing more specifically the effects of the peripheral pixels on the target pixel.

DESCRIPTION OF EMBODIMENTS

A preferred embodiment of an image processing device, an image processing method, and a projection apparatus according to the present invention will be described below with reference to the drawings. Specific numerical values, appearance configuration, and the like described in the embodiment are only examples for facilitating understanding of the present invention, and do not limit the present invention unless otherwise noted. Detailed descriptions and illustrations of elements that are not directly related to the present invention are omitted.

Embodiment

In the embodiment, a first calculation unit estimates, for light by a target pixel, a first sum of light intensities of dispersed lights that are dispersed due to light bleeding caused in accordance with properties of a projection optical system. The first calculation unit adds the estimated first sum of the light intensities to a light intensity by the target pixel, and calculates a new light intensity by the target pixel. In the embodiment, a second calculation unit estimates light intensities of dispersed lights due to respective lights of other pixels at a position corresponding to the target pixel, and calculates a second sum. Then, a combining unit subtracts the second sum of the light intensities estimated by the second calculation unit from the new light intensity by the target pixel calculated by the first calculation unit. In the embodiment, a pixel value of the target pixel is calculated based on the light intensity thereof that has been thus obtained, a display element is driven in accordance with the calculated pixel value, and projection is carried out.

In the embodiment, as described above, it has been configured that the first calculation unit compensates for the light intensity of the target pixel, which is lost by dispersion, and that the second calculation unit suppresses effects of the dispersed lights of other pixels on the target pixel. Thus, deterioration in image quality of a projected image due to the light bleeding is suppressed, and a projected image with a higher image quality can be obtained.

Figure 1:
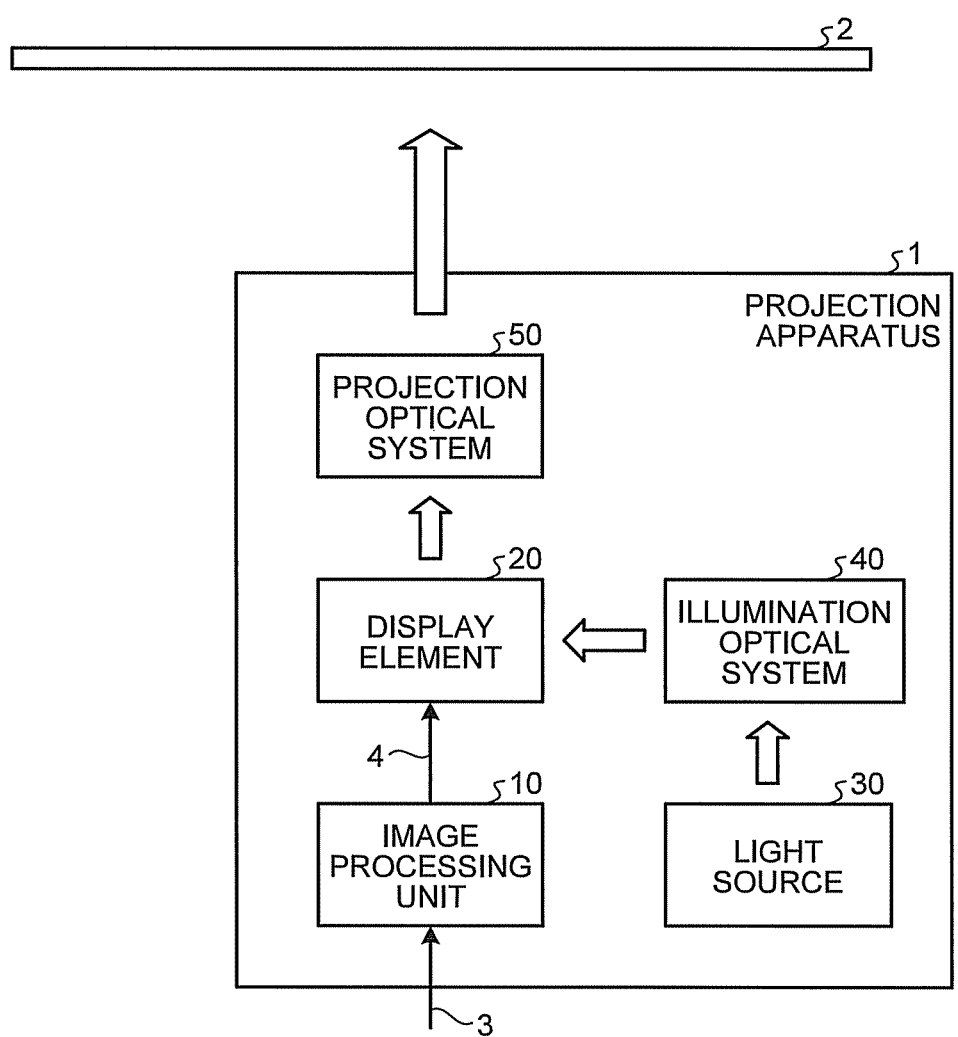
FIG. 1 is a block diagram illustrating a configuration of an example of a projection apparatus applicable to an embodiment of the present invention.

FIG. 1 illustrates a configuration of an example of a projection apparatus applicable to the embodiment. In FIG. 1, a projection apparatus 1 has an image processing unit 10, a display element 20, a light source 30, an illumination optical system 40, and a projection optical system 50.

In the projection apparatus 1, light that has been emitted from the light source 30 enters the display element 20 through the illumination optical system 40. The image processing unit 10 performs image processing that will be described later on an image signal 3 that has been input into the projection apparatus 1, and outputs the signal to the display element 20 as a projected image signal 4. The image signal 3 and the projected image signal 4 are digital signals respectively, and are regarded as both analogue signal and digital signal when the projected image signal 4 is considered as a display element driving signal that drives the display element 20.

The display element 20 is, for example, liquid crystal on silicon (LCOS), and is a light modulation element which modulates and emits light that has entered in accordance with image data. The display element 20 modulates and emits the light that has entered from the illumination optical system 40 in accordance with the projected image signal 4 that has been fed from the image processing unit 10. The light that has been emitted from the display element 20 is projected on a screen 2 as a projected image through the projection optical system 50 including an optical system that uses an optical component such as a projection lens and a cross dichroic prism. The projection optical system 50 may further include an optical mechanism such as a zoom mechanism, a focusing mechanism, and a shift mechanism.

Figure 2:
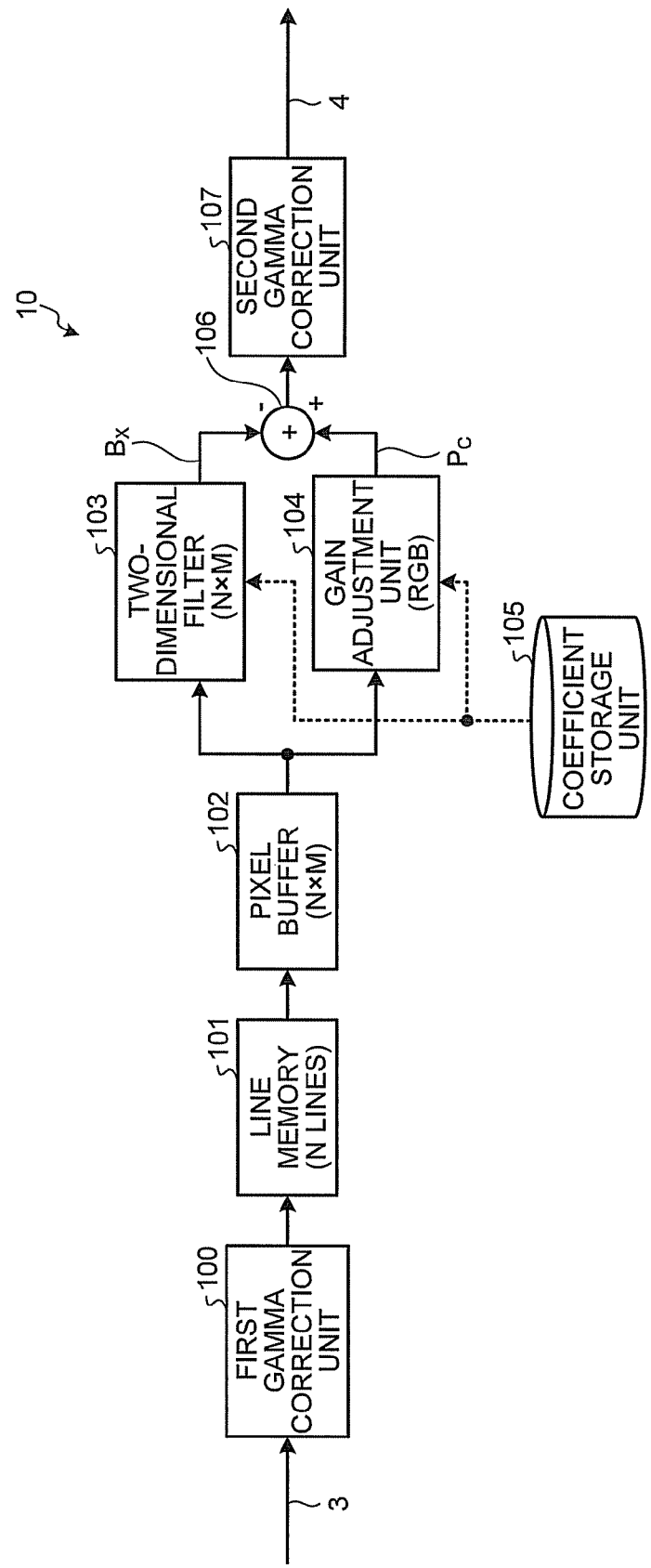
FIG. 2 is a block diagram illustrating a configuration of an example of an image processing unit according to the embodiment.

FIG. 2 illustrates a configuration of an example of the image processing unit 10 according to the embodiment. In FIG. 2, the image processing unit 10 has a first gamma correction unit 100, a line memory 101, a pixel buffer 102, a two-dimensional filter 103, a gain adjustment unit 104, a coefficient storage unit 105, a combining unit 106, and a second gamma correction unit 107.

An image signal that has been fed from outside is input into the image processing unit 10 and fed to the first gamma correction unit 100. Here, the image signal 3 is assumed to be, for example, a digital video signal with a resolution of 1920 horizontal pixels×1080 vertical lines and a frame rate of 60 frames per second (fps), and of respective colors of red (R), green (G), and blue (B). Needless to say, a format of the image signal 3 which can be input into the image processing unit 10 is not limited to this example.

The image signal 3 is input into the image processing unit 10 sequentially for each line from a line at an upper end of an image frame toward a line at a lower end thereof. The image signal 3 is also input into the image processing unit 10 sequentially for each pixel in each line from a left end of the image frame toward a right end thereof.

The image processing unit 10 independently performs processing for the image signal 3, which will be described later, on signals in respective colors of RGB. Hereinafter, unless otherwise noted, the image signal 3 is assumed to be image signals of the respective colors of RGB.

The first gamma correction unit 100 performs gamma correction on the fed image signal 3, and converts gradation property of the image signal 3 into linear property. For example, a standard digital video signal is subjected to gamma correction of $\gamma=2.2$, and gradation property thereof is non-linear. Thus, the first gamma correction unit 100 gamma correction of $\gamma=0.45$ ($=1.0/2.2$) on the fed image signal and converts the gradation property of the image signal 3 into linear property. As a result, image processing in a latter stage can be facilitated.

The image signal output from the first gamma correction unit 100 is stored in the line memory 101. Here, the image signal output from the first gamma correction unit 100 is a luminance signal corresponding to luminance values of R', G', and B' of the respective colors of RGB. The line memory 101 includes N (N is a natural number) line memories, each of which can store pixel signals for one line, and the N line memories as a whole reads and writes data by first in, first out (FIFO). As the line memory 101, a dual port type which has a writing port and a reading port and can write and read in parallel is used.

As an example, a case will be considered where the line memory 101 is full with the image signals stored by one line in each of the N line memories included in the line memory 101, and a pixel at a head of a next line is now fed to the line memory 101. In this case, a position of each pixel to be stored in each of the N line memories is shifted by one pixel, and the pixel is stored in a head of a first line memory. At the same time, a pixel at an end of each line memory is stored in a head of a next line memory. A pixel at an end of a last line memory is pushed out from the line memory and, for example, discarded.

The image processing unit 10 reads pixels stored in the line memory 101 by the predetermined block, and stores the pixels in the pixel buffer 102. For example, it is assumed that the pixel buffer 102 can store at least N×M pixels with N pixels in a vertical direction of an image and M (M is a natural number) pixels in a horizontal direction. The image processing unit 10 reads pixels by the block composed of N lines (pixels)×M pixels from the line memory 101, and stores the pixels in the pixel buffer 102. That is, the image processing unit 10 extracts, from each of the N line memories included in the line memory 101, M pixels at positions corresponding in the line, and stores the pixels in the pixel buffer 102 as a block of N×M pixels.

Practically, storing pixels in the pixel buffer 102 is performed with a predetermined delay for reading pixels from the line memory 101. For example, in a case where a value N and a value M are odd numbers, the pixels that have been read from the line memory 101 are delayed by (M/2+1) pixels in a pixel direction and (N/2+1) pixels in a line direction respectively to be stored in the pixel buffer 102. The pixels are sequentially stored in the pixel buffer 102 for each pixel clock.

The pixels that have been stored in a block of N lines×M pixels in the pixel buffer 102 are read by the two-dimensional filter 103 and the gain adjustment unit 104. Details will be described later, but the two-dimensional filter 103 and the gain adjustment unit 104 performs arithmetic processing on the pixels that are stored in the pixel buffer 102 by using a coefficient that is stored in advance in the coefficient storage unit 105 to calculate a pixel value of one pixel.

For example, when a pixel value for one pixel is output from the two-dimensional filter 103 and the gain adjustment unit 104, the image processing unit 10 reads the block of N lines×M pixels from the line memory 101 with one pixel shifted in the line direction, and stores the block in the pixel buffer 102. When pixel values of pixels for one line are output, the image processing unit 10 performs the similar processing on the next line to calculate a pixel value of each pixel.

Figure 3:
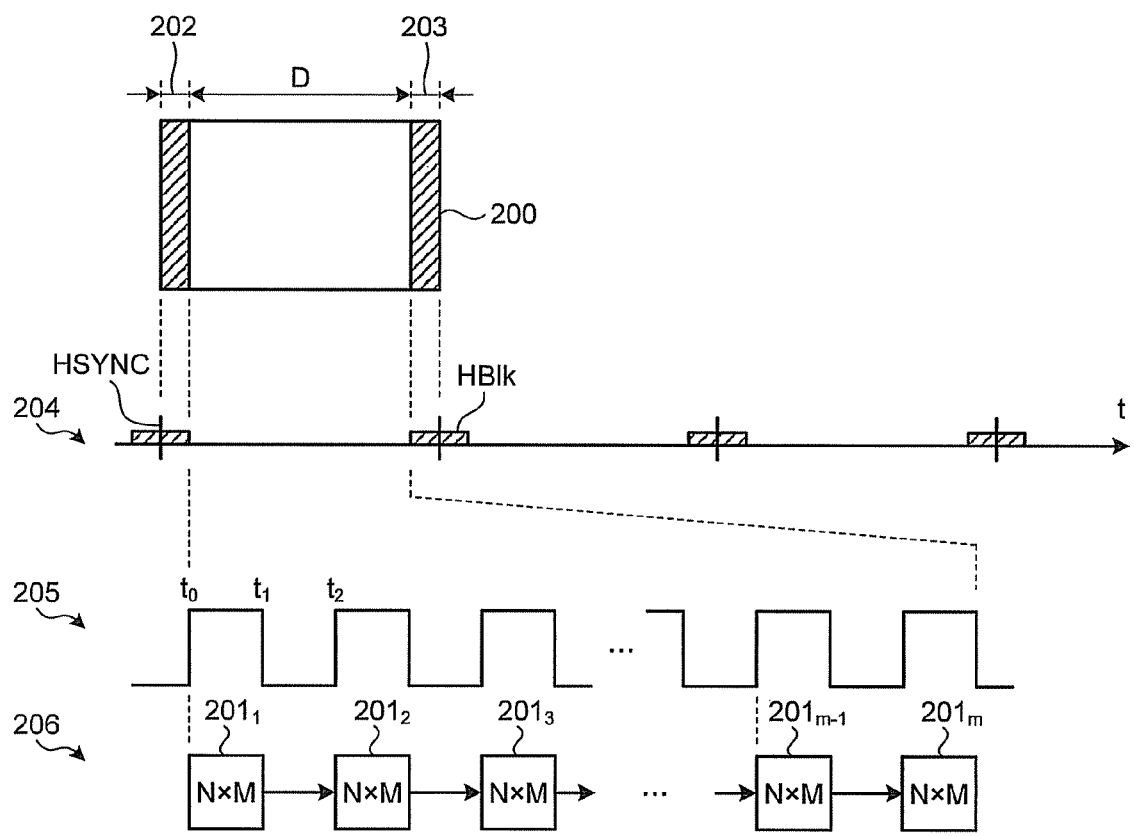
FIG. 3 is a diagram schematically illustrating exemplary reading and writing of a pixel in a pixel buffer according to the embodiment.

FIG. 3 schematically illustrates exemplary reading and writing of a pixel in the pixel buffer 102 according to the embodiment. In a top part of FIG. 3, an example of the image signal 3 that is input into the image processing unit 10 is illustrated as an image signal 200. In the image signal 200, a range for D (D is a natural number) pixels in a width direction is a display area, and shaded areas 202 and 203 on both sides of the display area are non-display areas respectively. In the image signal 200 illustrated in FIG. 3, non-display areas in a vertical direction are omitted.

Chart 204 illustrates an example of a horizontal synchronizing signal HSYNC of the image signal 200. As exemplified in chart 204, a horizontal blanking period HBlk corresponding to the non-display area in a horizontal direction is arranged corresponding to the horizontal synchronizing signal HSYNC. For example, pixels for one line are written into the line memory 101 in accordance with the horizontal synchronizing signal HSYNC during a period corresponding to a width D that indicates the display area. At a time when writing of pixels for N lines is completed, pixels for one line have been written into each of the N line memories in the line memory 101 from a head thereof. In this condition, when one pixel of the next line is written into the line memory 101 after the horizontal blanking period HBlk, a position of each pixel in each of the N line memories in the line memory 101 is shifted by one pixel.

Figure 4:
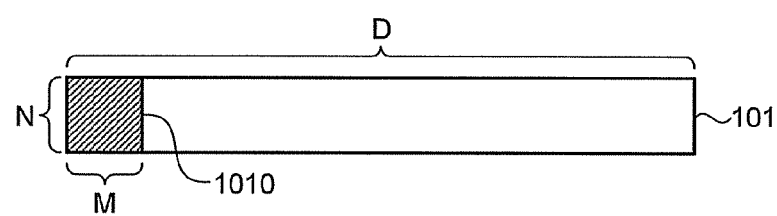
FIG. 4 is a diagram schematically illustrating an exemplary configuration of a line memory according to the embodiment.

The pixel buffer 102 stores pixels that have been read from the line memory 101 in a block 201 composed of N lines×M pixels. As exemplified in FIG. 4, the line memory 101 includes N line memories, each of which can store D pixels, and forms a storage area of N lines×D pixels as a whole. For example, in this storage area of N lines×D pixels, a reading area 1010 of N lines×M pixels that extracts pixels to be stored in the pixel buffer 102 is set. In this example, the reading area 1010 is set at a head of the line memory 101.

Referring back to the description of FIG. 3, chart 205 illustrates an exemplary pixel clock that specifies a timing of a pixel. For example, a pixel is written in the line memory 101 at a clock rising timing. The image processing unit 10 executes processing from reading the block 201 from the line memory 101 to an end of processing by the two-dimensional filter 103 and the gain adjustment unit 104 at a timing of one pixel clock.

As exemplified in chart 206, the image processing unit 10 reads, for example, a block $201_1$ including pixels for N lines×M pixels in the reading area 1010 from the line memory 101 in which pixels, for example, from a first line to an Nth line of the image signal 200, at a timing $t_0$ corresponding to the pixel clock to store the block in the pixel buffer 102. In the image processing unit 10, the two-dimensional filter 103 and the gain adjustment unit 104 execute processing for pixels included in the block $201_1$ that has been stored in the pixel buffer 102 by a timing $t_2$ of the next pixel clock to output a pixel value 1.

The image processing unit 10 starts reading a next block $201_2$ from the line memory 101 at the timing $t_2$. This block $201_2$ is a block where each pixel to be stored in the line memory 101 has been shifted relative to the reading area 1010 by one pixel in the pixel direction, as a result of writing one pixel in the line memory 101 at the timing $t_2$. That is, the block $201_2$ is a block where pixels included have been shifted by one pixel relative to the block $201_1$.

The image processing unit 10 reads this block $201_2$, similarly to the above, from the reading area 1010 of the line memory 101, and writes the block in the pixel buffer 102. Then, the image processing unit 10 reads the block $201_2$ from the pixel buffer 102, executes processing in the two-dimensional filter 103 and the gain adjustment unit 104, and outputs a next pixel value. The image processing unit 10 executes this processing from reading the block $201_2$ from the line memory 101 to outputting one pixel value at the timing of one pixel clock.

The image processing unit 10 executes the above processing for each pixel clock to a block $201_m$ at an end of a line. The image processing unit 10 starts storing pixels of the next line in the line memory 101 after the end of the horizontal blanking period HBlk, and repeats, similarly to the above, processing for a block that has been read for each pixel clock from the reading area 1010.

(Processing According to the Embodiment)

Figure 5:
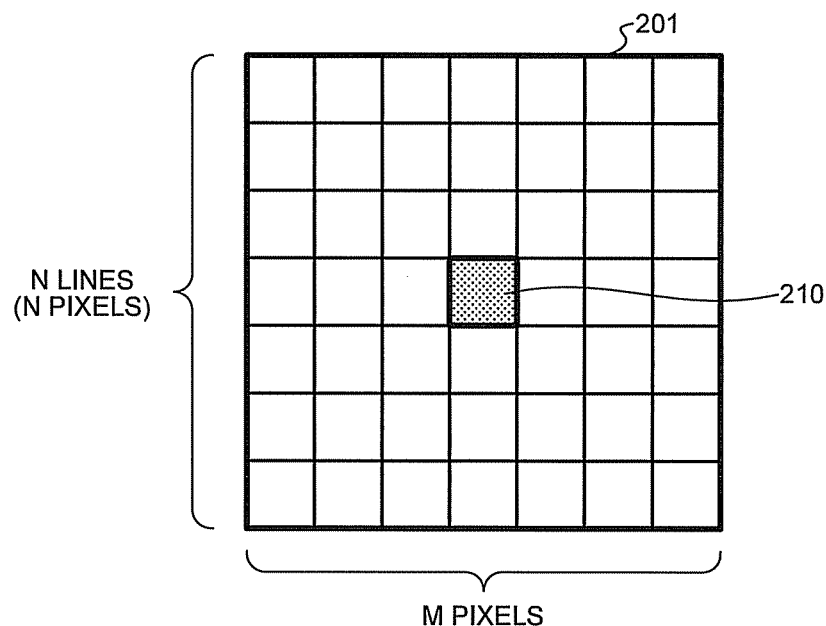
FIG. 5 is a diagram illustrating an exemplary block that is fed to a two-dimensional filter and a gain adjustment unit according to the embodiment.

Next, processing in the two-dimensional filter 103 and the gain adjustment unit 104 described above according to the embodiment will be described. FIG. 5 illustrates an example of the block 201 that is provided to the two-dimensional filter 103 and the gain adjustment unit 104 according to the embodiment. In FIG. 5, the block 201 of N lines (pixels)×M pixels is illustrated, representing blocks $201_1$, $201_2$ . . . , and $201_m$ that have been described using chart 206 of FIG. 3. In an example of FIG. 5, there is an assumption of N=M=7 pixels, and the block 201 includes 49 pixels obtained from 7 pixels×7 pixels.

Hereinafter, descriptions will be provided assuming that a shape of the light bleeding caused by the projection optical system 50 is concentric around a pixel, and that a pixel 210 in the center of the block 201 has been selected as a target pixel 210. That is, it is assumed below that dispersed lights due to the light bleeding are caused concentrically around light of the target pixel 210.

The target pixel 210 is not limited to the pixel in the center of the block 201, and any pixel in the block 201 may be selected as the target pixel 210. For example, in a case where the shape of the light bleeding by the projection optical system 50 is not concentric around the target pixel 210 and set to be elliptic or others, a pixel at an appropriate position in the block 201 can be selected as the target pixel 210.

(Processing by the Gain Adjustment Unit)

Processing in the gain adjustment unit 104 as the first calculation unit will be described. The gain adjustment unit 104 according to the embodiment estimates the first sum of the peripheral light intensities of the dispersed lights due to the light bleeding of the light that is emitted from the projection optical system 50 based on the target pixel 210. Then, the gain adjustment unit 104 adds the estimated first sum to a light intensity based on the pixel value of the target pixel 210 to calculate a corrected light intensity $P_C$ of the target pixel 210.

That is, the light bleeding is caused by the light passing through the projection optical system 50. This attenuates the light intensity of an original light by the dispersed lights due to the light bleeding. Thus, the gain adjustment unit 104 according to the embodiment compensates for the attenuation of the light intensity of the original light due to the light bleeding by calculating the first sum of the dispersed lights due to the light bleeding and adding the sum to the light intensity of the original light.

Here, a light intensity based on a pixel, that is, the light intensity of the light that has been emitted from the light source 30 and modulated based on the pixel by the display element 20 is considered to correspond to a pixel value of the pixel. Thus, processing by the gain adjustment unit 104 is executed, regarding the pixel value of the target pixel 210 as the light intensity of the light based on the target pixel 210.

A light intensity F of the dispersed lights due to the light bleeding at each position can be estimated by calculating by the following formula (1) using a distance R from the target pixel 210. In the formula (1), a proportional constant a and an index b are values that have been calculated in advance by experiments and simulations, for example. Practically, the image signal 200 is a signal for each pixel. Therefore, a distance between pixels, which is a distance between a center of one pixel and a center of another pixel, is used for the distance R in the formula (1).

$$F = \frac{a}{R^b} \quad (1)$$

Figure 6:
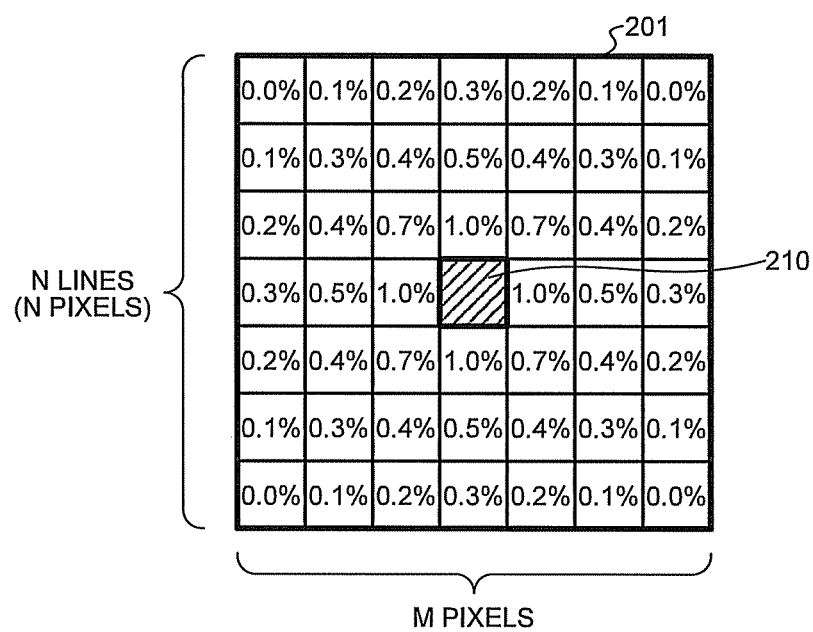
FIG. 6 is a diagram illustrating an exemplary distribution of light intensity for each pixel in the block according to the embodiment.

FIG. 6 illustrates an exemplary distribution of light intensities for each pixel in the block 201 based on light intensities F that have been calculated using the formula (1) according to the embodiment. In FIG. 6, the distribution of the light intensities is illustrated in percentage of the light intensity of the light based on the target pixel 210, such as 0.1% and 0.7%. These light intensity distribution data are calculated in advance and stored in the coefficient storage unit 105 as coefficients with respect to the light intensity related to the target pixel 210. In FIG. 6, the light intensities of the dispersed lights due to the light bleeding are illustrated as concentrically distributed with respect to a position of the target pixel 210.

The gain adjustment unit 104 calculates a first sum $B_s$ of light intensities F that have been calculated by the above formula (1). The first sum $B_s$ can be calculated by the following formula (2), for example. In the formula (2), a value $P_O$ is the light intensity of the light based on the target pixel 210. A variable i is a series of indices given to each of (N×M−1) pixels excluding the target pixel 210 in the block 201.

$$B_s = \sum_{i=1}^{N \times M - 1} \left( \frac{a}{R_i^b} \times P_o \right) \quad (2)$$

A light intensity $P_O$ of the target pixel 210 is a value obtained by subtracting the first sum $B_s$ of light intensities F of the dispersed lights due to the light bleeding from a perfect light intensity $P_P$. Therefore, the gain adjustment unit 104 calculates a corrected light intensity $P_c$ according to the following formula (3).

$$P_C = P_O + B_S \quad (3)$$

In a perfect condition without any light bleeding, the first sum $B_s = 0$, and the corrected light intensity $P_c$ and the light intensity $P_O$ of the target pixel 210 become equal.

In the above, the first sum $B_S$ has been calculated based on the light intensities F that have been calculated using a pixel distance between the target pixel 210 and each pixel, but it is not limited to this example. For example, the first sum $B_S$ can also be calculated as an integral value of the light intensities F when the distance from the target pixel 210 is continuously obtained.

(Processing by the Two-Dimensional Filter)

Processing at the two-dimensional filter 103 as the second calculation unit will be described. The two-dimensional filter 103 according to the embodiment estimates the light intensities, at the position of the target pixel 210, of the dispersed lights due to the light bleeding of peripheral pixels positioned around the target pixel 210 to calculate the second sum of the estimated light intensities. By subtracting this second sum from the light intensity based on the pixel value of the target pixel 210, the light intensity of the target pixel 210 excluding effects of the peripheral pixels can be calculated.

That is, the light bleeding is caused, as with the target pixel 210, by the peripheral pixels around the target pixel 210 as well. Superimposing the dispersed lights due to this light bleeding on the light by the target pixel 210 causes deterioration in resolution of the projected image. When the respective colors of RGB are considered, the luminance values thereof become higher than their original luminance values by the superimposition of the dispersed lights based on the peripheral pixels, which may cause deterioration in color saturation and contrast.

Thus, the two-dimensional filter 103 according to the embodiment calculates the second sum of the light intensities of the dispersed lights due to the light bleeding of the peripheral pixels at the position of the target pixel 210. Then, by subtracting the calculated second sum from the light intensity of the target pixel 210 in the combining unit 106 in a latter stage, the effects of the peripheral pixels on the target pixel 210 are excluded.

Figure 7:
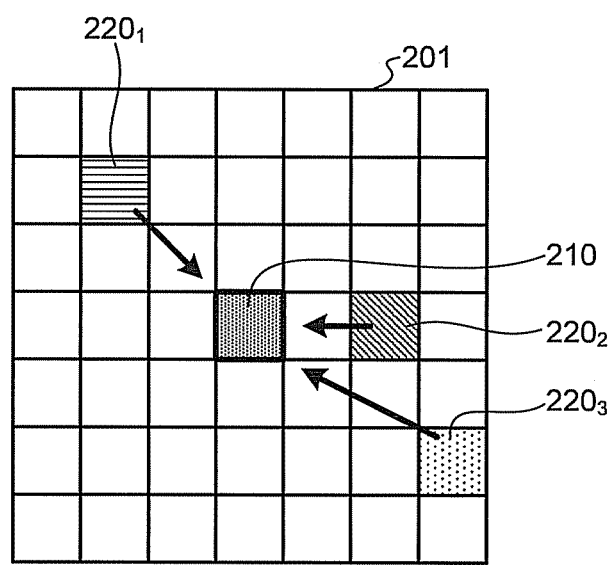
FIG. 7 is a diagram for describing more specifically effects of peripheral pixels on a target pixel.

The effects of the peripheral pixels on the target pixel 210 will be more specifically described using FIGS. 7, 8A, 8B, and 8C. As illustrated in FIG. 7, in the block 201, the target pixel 210 and peripheral pixels $220_1$, $220_2$, and $220_3$ around the target pixel 210 will be considered. Through the projection optical system 50, as illustrated by arrows in FIG. 7, the dispersed lights due to the light bleeding of the lights of these peripheral pixels $220_1$, $220_2$, and $220_3$ are superimposed on the light by the target pixel 210.

The peripheral pixels $220_1$, $220_2$, and $220_3$ are assumed to be the pixels in a range where the dispersed lights due to the light bleeding of their respective lights affect the light of the target pixel 210.

FIGS. 8A, 8B, and 8C illustrate exemplary effects of the dispersed lights on the target pixel 210 for each of the peripheral pixels 220₁, 220₂, and 220₃. With reference to FIG. 8A, by the above formula (1), light intensities F of dispersed lights due to light bleeding based on light of one pixel at a position of another pixel are determined by a distance R between the one pixel and another pixel. Therefore, the light intensity, at the position of the target pixel 210, of the dispersed lights due to the light bleeding of the light of the peripheral pixel 220₁ can be calculated using a light intensity distribution that has been calculated with the position of the target pixel 210 as a center. Data indicating this light intensity distribution have been, as described above, calculated in advance and stored in the coefficient storage unit 105.

In the example of FIG. 8A, the light intensity, at a position of the peripheral pixel 220₁, of the dispersed lights due to the light bleeding of the light of the target pixel 210 is assumed to be 0.3% of the light intensity of the light of the target pixel 210. Thus, the light intensity, at the position of the target pixel 210, of the dispersed lights due to the light bleeding of the light of the peripheral pixel 220₁ is estimated to be 0.3% of the light intensity of the peripheral pixel 220₁.

Similarly, with reference to FIGS. 8B and 8C respectively, the light intensities, at the position of the target pixel 210, of the dispersed lights due to the light bleeding of the lights of the peripheral pixels 220₂ and 220₃ are estimated to be 0.5% and 0.1%, respectively, of the light intensities of the peripheral pixels 220₂ and 220₃.

Thus, a sum of the dispersed lights due to the light bleeding of the lights of the peripheral pixels 220₁, 220₂, and 220₃ at the position of the target pixel 210 is calculated as (luminance of peripheral pixel 220₁)×0.3%+(luminance of peripheral pixel 220₂)×0.5%+(luminance of peripheral pixel 220₃)×0.1%. Here, similarly to the above, on the calculation, the light intensity is regarded as luminance of a pixel.

More specifically, the two-dimensional filter 103 calculates, for all pixels i excluding the target pixel 210 in the block 201, a light intensity $P_i$, at the position of the target pixel 210, of the dispersed lights due to the light bleeding of the light of the pixels, using a coefficient that is stored in the coefficient storage unit 105. Then, the two-dimensional filter 103 calculates a second sum $B_X$ of the light intensities $P_i$ that have been calculated for each pixel i. For example, the two-dimensional filter 103 calculates the second sum $B_X$ according to the following formula (4).

$$B_x = \sum_{i=1}^{N \times M-1} \left( \frac{a}{R_i^b} \times P_i \right) \quad (4)$$

Description will be referred back to FIG. 2. The gain adjustment unit 104 inputs the corrected light intensity $P_c$ calculated by the above formula (3) into an input terminal for addition of the combining unit 106. The two-dimensional filter 103 also inputs the second sum $B_X$ calculated by the above formula (4) into an input terminal for subtraction of the combining unit 106. The combining unit 106 subtracts the sum $B_X$ from the corrected light intensity $P_c$ to calculate the perfect light intensity $P_P$ of the light by the target pixel 210.

That is, the light intensity $P_0$ of the light by the target pixel 210 can be represented by the following formula (5) using the perfect light intensity $P_P$ of the light by the target pixel 210, and the first sum $B_S$ and the second sum $B_X$ described above.

$$P_0 = P_P - B_S + B_X \quad (5)$$

Thus, the perfect light intensity $P_P$ by the light of the target pixel 210 is represented by the following formula (6).

$$P_P = P_0 + B_S - B_X \quad (6)$$

Here, by the above formula (3), $P_0 + B_S = P_C$. Thus, by subtracting the sum $B_X$, which has been output from the two-dimensional filter 103, from the corrected light intensity $P_c$ output from the gain adjustment unit 104 in the combining unit 106, the perfect light intensity $P_P$ by the light of the target pixel 210 can be obtained.

The combining unit 106 outputs a pixel whose pixel value corresponds to the light with the light intensity $P_P$ that has been obtained as described above. The pixel output from the combining unit 106 is fed to the second gamma correction unit 107. The second gamma correction unit 107 performs gamma correction of, for example, γ=2.2, on the fed pixel to output the pixel with gradation properties as non-linear properties. The pixel that has been output from the second gamma correction unit 107 is output from the image processing unit 10 as the projected image signal 4.

The projected image signal 4 output from the image processing unit 10 is fed to the display element 20. The display element 20 modulates the light, which has been emitted from the light source 30 and passed through the illumination optical system 40, for each pixel based on the projected image signal 4 that has been fed from the image processing unit 10. The light that has been modulated by the display element 20 is projected on the screen 2 as a projection light through the projection optical system 50. The light bleeding of this projection light, caused by the projection optical system 50, has been corrected by the image processing unit 10. Therefore, a projected image with a higher image quality can be obtained on the screen 2.

The image processing unit 10 processes each color of RGB. Therefore, not only luminance but also colors can be corrected. For example, as for R, color components that are lost by the light bleeding are added to each pixel, and the luminance of each pixel is corrected by processing of the gain adjustment unit 104. Along therewith, effects of the dispersed lights due to the light bleeding of the lights of pixels in the respective colors of RGB on the target pixel 210 are suppressed, and effects of the respective colors of RGB on each other are suppressed. Therefore, the color saturation of the projected image can be improved.

Furthermore, as described above, the light bleeding caused by the projection optical system 50 has a two-dimensional shape such as a concentric shape with light of a pixel as a center. Thus, the image processing unit 10 according to the embodiment calculates the effects of the peripheral pixels on the target pixel 210 using the two-dimensional filter 103 which is capable of filtering in two dimensions with an X-axis (horizontal direction) and a Y-axis (vertical direction). As a result, filtering for two-dimensional shapes, which has been difficult by a horizontal filter and a vertical filter that execute processing in one dimension, becomes easy, and the dispersed lights due to the light bleeding of the peripheral pixels at the position of the target pixel 210 can be eliminated efficiently.

In addition, the image processing unit 10 according to the embodiment executes processing by the two-dimensional filter 103 and the gain adjustment unit 104 by a combination of the line memory 101 and the pixel buffer 102. Therefore, the image processing unit 10 can execute processing according to the embodiment in real time without using a frame memory and also reduce device cost.

Furthermore in the embodiment, deterioration in image quality of the projected image due to the light bleeding is suppressed by image processing in the image processing unit 10. Therefore, compared with a method for suppressing the deterioration in image quality of the projected image due to the light bleeding by an optical approach to the projection optical system 50 such as addition of a sophisticated anti-reflection film and use of a glass material with high transmittance, the device cost can be reduced.

According to an embodiment of the present invention, an image can advantageously be projected with a higher quality.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

REFERENCE SIGNS LIST

1 PROJECTION APPARATUS
2 SCREEN
10 IMAGE PROCESSING UNIT
20 DISPLAY ELEMENT
30 LIGHT SOURCE
40 ILLUMINATION OPTICAL SYSTEM
50 PROJECTION OPTICAL SYSTEM
100 FIRST GAMMA CORRECTION UNIT
101 LINE MEMORY
102 PIXEL BUFFER
103 TWO-DIMENSIONAL FILTER
104 GAIN ADJUSTMENT UNIT
105 COEFFICIENT STORAGE UNIT
106 COMBINING UNIT
107 SECOND GAMMA CORRECTION UNIT
201, $201_1$, $201_2$, $201_3$, $201_{D-M-1}$, $201_{D-M}$ BLOCK
210 TARGET PIXEL
$220_1$, $220_2$, $220_3$ PERIPHERAL PIXEL

What is claimed is:

1. An image processing device comprising:
a first calculation unit that calculates a first sum which is a sum of light intensities of dispersed lights generated when a pixel light by a target pixel passes through an optical system, based on distance from the target pixel, to calculate a first light intensity by adding the first sum to a light intensity of the pixel light;
a second calculation unit that calculates a second sum which is a sum, at a position of the target pixel, of each of light intensities of dispersed lights generated when each of pixel lights by pixels around the target pixel pass through the optical system, based on distance from the target pixel;
a combining unit that calculates a second light intensity of the pixel light by the target pixel by subtracting the second sum from the first light intensity;
N (N is a natural number) line memories that store images for each line; and
a pixel storage unit that extracts, from each of the N line memories, M (M is a natural number) pixels at positions corresponding in the lines to store N×M pixels,
wherein the first calculation unit assumes one pixel of the N×M pixels that are stored in the pixel storage unit as the target pixel to calculate the first sum in a range of the N×M pixels.

2. The image processing device according to claim 1, wherein first calculation unit calculates the first sum based on the light intensities of the dispersed lights on N×M pixels except the target pixel.

3. An image processing method in an image processing device comprising N (N is a natural number) line memories that store images for each line and a pixel storage unit that extracts, from each of the N line memories, M (M is a natural number) pixels at positions corresponding in the lines to store N×M pixels comprising:
a first calculation step to calculate a first sum which is a sum of light intensities of dispersed lights generated when a pixel light by a target pixel passes through an optical system, based on distance from the target pixel, to calculate a first light intensity by adding the first sum to a light intensity of the pixel light;
a second calculation step to calculate a second sum which is a sum, at a position of the target pixel, of each of light intensities of dispersed lights generated when each of pixel lights by pixels around the target pixel pass through the optical system, based on distance from the target pixel; and
a combining step to calculate a second light intensity of the pixel light by the target pixel by subtracting the second sum from the first light intensity,
wherein the first calculation unit assumes one pixel of the N×M pixels that are stored in the pixel storage unit as the target pixel to calculate the first sum in a range of the N×M pixels.

4. A projection apparatus comprising:
a light modulation element that modulates light from a light source, based on an image including a plurality of pixels, for each of the plurality of pixels;
an optical system that projects outside the light that has been modulated by the light modulation element;
a first calculation unit that calculates a first sum which is a sum of light intensities of dispersed lights generated when a pixel light by a target pixel in a plurality of pixels included in an input image passes through an optical system, based on distance from the target pixel, to calculate a first light intensity by adding the first sum to a light intensity of the pixel light;
a second calculation unit that calculates a second sum which is a sum, at a position of the target pixel, of each of light intensities of dispersed lights generated when each of pixel lights by pixels around the target pixel pass through the optical system, based on distance from the target pixel; and
a combining unit that calculates a second light intensity of the pixel light by the target pixel by subtracting the second sum from the first light intensity,
wherein the light modulation element modulates the light from the light source for each of the plurality of pixels which is included in the input image and the second light intensity of which has been calculated individually in the combining unit.

5. The image processing device according to claim 4, wherein the first calculation unit, the second calculation unit, and the combining unit process pixels in respective colors of RGB separately.

6. The image processing device according to claim 4, wherein the second calculation unit comprises a two-dimensional filter that estimates the second sum in two dimensions.

* * * * *